Patented Apr. 21, 1953

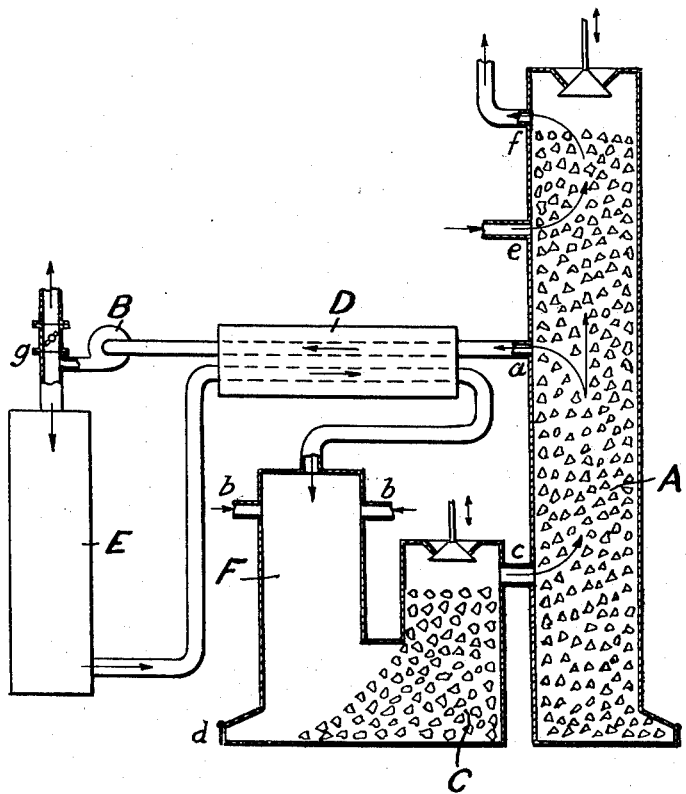

2,635,957

UNITED STATES PATENT OFFICE 2,635,957

PROCESS FOR REDUCING ORES

Bo Mikael Sture Kalling, Domnarvet, Einar Louis Améen, Surahammar, and John Ludvig Stålhed, Soderfors, Sweden, assignors to Stora Kopparbergs Bergslags Aktiebolag, Falun, Sweden, a corporation of Sweden Application March 1, 1949, Serial No. 78,988
In Sweden March 20, 1947

1 Claim. (Cl. 75—35)

In the reduction of iron oxides to metallic iron using carbon as substantial reducing agent it is a primary condition for the economic realization of the process that the reduction capacity of the carbon is effectively utilized, i. e. that the ratio carbon dioxide to carbon monoxide is the highest possible in the discharge gas. As is known favourable conditions in this respect may be obtained if carbon and ore are kept separate during the process, the reduction being brought about by means of a gas rich in carbon monoxide which is allowed to circulate between the reduction furnace and carburetter heated in some way or other. The process is principally carried out in such a way that a certain quantity of obtained reduction gas containing carbon dioxide is taken out from the reduction furnace at a suitable level and is led to the carburetter where the carbon dioxide content of the gas is converted into carbon monoxide with carbon, whereupon the gas is returned to the reduction furnace where it is partially converted into carbon dioxide while reducing the ore.

The reaction in the carburetter between carbon dioxide and carbon during the formation of carbon monoxide being strongly endothermic, a considerable supply of heat to the carburetter is required for carrying out the process. According to processes already known this can be effected by supplying heat generated by electric current to the carburetter or to the gas immediately prior to said gas entering the carburetter. In both these cases, however, the carburization furnace becomes relatively complicated and the considerable amount of electric energy required may sometimes be difficult to obtain at a sufficiently low price.

The heating of the carburetter may also take place in such a way that free oxygen in pure form or as air enriched in oxygen is supplied to the gas in such a great quantity that the combustion of carbon to carbon monoxide gives the effect required for the carburizing and for the heating of the gas. As a matter of fact, a greater quantity of carbon is thereby consumed for carrying out the reduction process but the advantages which are gained by a lower power consumption and a simpler furnace construction, may in many cases counterbalance this disadvantage.

However, a disadvantage in carrying out the process according to this principle consists in the fact that the quantity of excess gas not utilized for the process becomes relatively great. If it is desired to obtain a possibility of utilizing all of the carbon for the reduction process properly it is, according to the present invention, possible to carry out the process in such a way that part of the carbon dioxide of the circulation gas is absorbed according to some known process prior to the gas entering the carburetter. Due to this less carbon is required in the carburetter for the reduction of carbon dioxide to carbon monoxide as well as for the combustion with oxygen to carbon monoxide. The drawing illustrates schematically an embodiment of the invention. The circulation gas which is taken out from the reduction furnace A at $a$ is first conducted through a heat exchanger D and then through the fan B or possibly a compressor to the carbon dioxide absorber E where a suitable quantity of carbon dioxide is separated off. Alternatively only a part of the gas may be led through the carbon dioxide absorber in which case a more complete absorption of the carbon dioxide content of the gas is required. After renewed heating in the heat exchanger D the gas is led through the carburetter C after having passed through a combustion chamber F in which the oxygen gas is supplied at $b$, whereupon the gas is reintroduced in the reduction furnace at $c$.

Carried out in this manner the process is theoretically calculated to consume only about 240 kgs. of C and 215 kgs. of O per ton of reduced Fe. No surplus of carbon monoxide containing gas will arise in this case, but in practice the process should be adjusted in such a manner that a gas excess suitable for preheating the charge (by introducing air at $e$) is obtained, which results in a slight increase of the carbon consumption.

Generally, the reaction system is not free from hydrogen gas. A certain, substantial percentage of hydrogen in the reduction gas is desirable, said hydrogen increasing the reaction speed and also counteracts the development of too high temperature in the shaft which may be a result if the reduction is carried out with carbon monoxide only. An ideal reduction gas should contain about 30–35% of $H_2$ and 65–70% of $CO$. As water is formed at the reduction with hydrogen, which water can be more easily removed from the gas than carbon dioxide, the consumption of carbon and oxygen gas in the carburetter may be reduced in a relatively simple manner if hydrogen is present in the system. In such case a substantial quantity of the hydrogen must not be supplied in the form of water in the carburetter as thereby a superfluous quantity of additional oxygen is supplied to the process resulting in a higher consumption of carbon and oxygen gas. The hydrogen should be supplied in a form as free from oxygen as possible, e. g. in the form of hydrocarbons. Ordinary fuel oil, natural gas as also ordinary mineral coal are suitable hydrogen sources. The schematical diagram in the drawing may be used to illustrate the process also in this embodiment. In this case, however, the container E denotes an apparatus for absorption of water instead of carbon dioxide. The reducing agent containing hydrogen is introduced into the shaft F preferably at the same level or levels as the oxygen gas. It may also be suitable to design the apparatus in such a way that, besides water, also a certain quantity of carbon dioxide is absorbed. If the reduction gas is calculated to contain 70% of CO and 30% of $H_2$, the theoretical consumption at absorption of the water percentage only of the circulating gas becomes about 215 kgs. of C, about 18 kgs. of $H_2$ and about 190 kgs. of $O_2$ per ton reduced Fe in the iron sponge. A relatively inconsiderable quantity of excess gas containing carbon monoxide and hydrogen is obtained.

If it is assumed that all of the hydrogen in the system is supplied through oil injection in the carburetter and if it is assumed that the oil contains 85% of C and 12% of $H_2$, at the same time about 130 kgs. of C are supplied together with a hydrogen quantity of 18 kgs., i. e. the oil becomes the substantial carburizing agent, which might be advantageous for the rapid and effective carrying out of the carburisation. The use of a reducing agent containing hydrogen with a lower percentage of hydrogen in relation to the carbon percentage than oil can make it possible to carry out the process without solid carbon in the carburetter even at the ideal hydrogen gas percentage of 30% here assumed in the reduction gas. In certain cases a higher percentage of hydrogen gas may be allowed and the hydrogen percentage of the reduction agent may consequently be increased in corresponding degree.

It has been assumed in the above example that the oxygen has been supplied to the carburetter in pure form. However, this is not necessary. The oxygen may also be diluted with nitrogen, but the ratio oxygen to nitrogen should be high because the economy of the process is considerably reduced at a high percentage of nitrogen in the gas.

The present invention is not limited to the embodiments described above. It comprises all processes for the reduction of iron ore with circulating gas and carburization. It may also be applied to other reduction furnaces than shaft furnaces, such as channel furnaces, rotating furnaces, container systems and so on. It may also be used with advantage in processes in which the product is melted in direct sequence to the reduction.

What is claimed is:

A process for reducing oxidic ores which comprises establishing and maintaining a column of the ore, introducing a hot reducing gas containing hydrogen and carbon monoxide and substantially free of water into said column of ore, causing said gas to flow through said column countercurrently to said ore, withdrawing a part at least of said gas from said column of ore after it has traversed only a proper fractional part thereof, cooling said withdrawn gas, separating water from the cooled gas, restoring the composition and temperature of the gas by introducing an oxygen-containing gas and a hydrocarbon into said gas and burning said oxygen and hydrocarbon in the presence of said gas and passing the resulting gas mixture in contact with hot solid carbonaceous material, and reintroducing the restored gas into said ore column.

BO MIKAEL STURE KALLING.
EINAR LOUIS AMÉEN.
JOHN LUDVIG STÅLHED.

References Cited in the file of this patent

UNITED STATES PATENTS

| Number | Name | Date |
|---|---|---|
| 1,256,623 | Westberg | Feb. 19, 1918 |
| 1,401,222 | Wiberg | Dec. 27, 1921 |
| 2,048,112 | Gahl | June 21, 1936 |

FOREIGN PATENTS

| Number | Country | Date |
|---|---|---|
| 441,429 | Great Britain | Jan. 20, 1936 |
| 72,433 | Sweden | May 23, 1928 |
| 80,344 | Sweden | May 8, 1934 |

OTHER REFERENCES

Ser. No. 360,935, W. Schwier (A. P. C.), published May 4, 1943.

The Iron Age, vol. 153, January 20, 1944, pages 55 to 59 and 150; January 29, pages 56 to 65.